C. C. ASHTON & A. WAGNER.
VARIABLE SPEED MOTOR DRIVE.
APPLICATION FILED APR. 29, 1914.
1,193,448.
Patented Aug. 1, 1916.
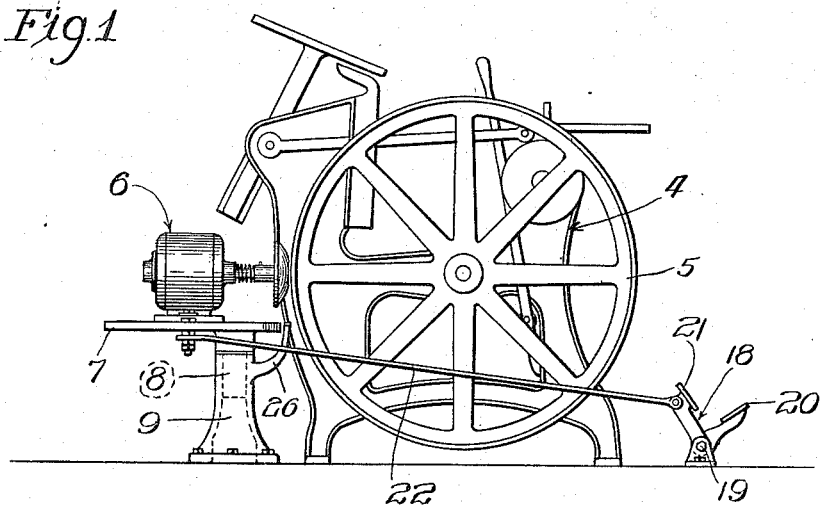
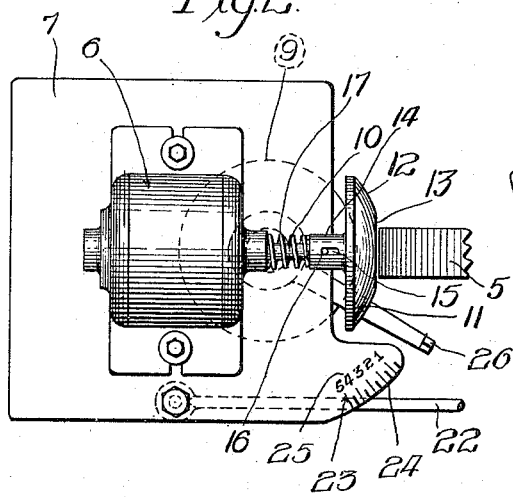
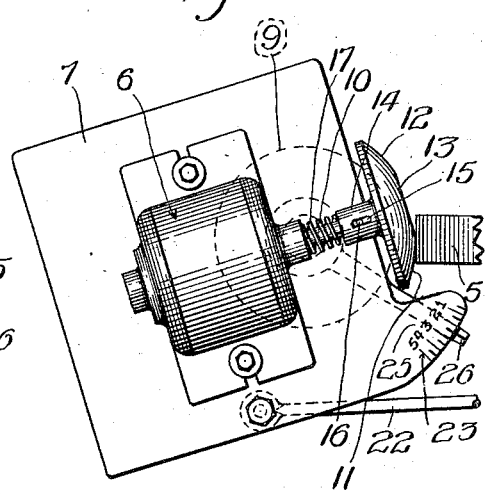
Witnesses:
Inventors
Ceacil C. Ashton
Arthur Wagner
by Banning & Banning
Attys.

UNITED STATES PATENT OFFICE.

CEACIL C. ASHTON AND ARTHUR WAGNER, OF CHICAGO, ILLINOIS.

VARIABLE-SPEED MOTOR-DRIVE.

1,193,448.

Specification of Letters Patent.

Patented Aug. 1, 1916.

Application filed April 29, 1914. Serial No. 835,254.

*To all whom it may concern:*

Be it known that we, CEACIL C. ASHTON and ARTHUR WAGNER, both citizens of the United States, and both residing at Chicago, in the county of Cook and State of Illinois, have invented certain new and useful Improvements in Variable - Speed Motor-Drives, of which the following is a specification.

The present invention has reference to certain improvements in variable speed motor drives, and has reference particularly to variable speed friction drives.

The features of our invention may be conveniently applied to use for controlling the speeds of printing presses and the like, where the motors are run at uniform speed. However, the features of the invention are not limited to this particular use.

The main object of the invention is to provide a variable speed friction drive of such construction that the power will be transferred from the motor to the driven mechanism with a maximum of efficiency at the various operating speeds; also in this connection to provide a construction such that the amount of friction at the various operating speeds will remain substantially constant, so that the transmission will operate as effectively at one speed as at another.

Another object is to provide a construction such that, when the friction drive stands at the central or off position, the friction elements will be entirely disengaged from each other, thereby obviating any unnecessary loss of energy when the motor is running idle.

Another object of the invention is to provide a construction and arrangement of great simplicity which can be cheaply and easily manufactured, and which will not readily become disabled or injured, but nevertheless to provide a construction so that all of the desired results may be secured with accuracy of control and permanency of structure.

Other objects and uses will appear from a detailed description of the invention which consists in the features of construction and combinations of parts hereinafter described and claimed.

In the drawing: Figure 1 shows a side elevation of a printing press of simple and familiar construction having applied thereto a motor and speed control mechanism embodying the features of our invention; Fig. 2 shows a plan view of the motor and speed control mechanism standing in the zero or off position; and Fig. 3 shows a view similar to that of Fig. 2, with the exception that the speed control mechanism has been thrown into operation.

There is shown a printing press 4 of familiar construction, the same being provided with a fly wheel or driving wheel 5. The motor is designated by the numeral 6. It is conveniently shown as mounted on a platform or plate 7, the same, in turn, being provided with a pivotal lug or the like 8, which is mounted within a standard 9, so that the platform 7 can be swung into various positions. This swinging of the platform will likewise rock or swing the motor and the motor shaft with respect to the wheel 5.

The motor shaft 10 carries a friction disk 11 on its forward end. This friction disk has its surface 12 formed as a portion of a sphere, the radius of the sphere being equal to the distance from the pivotal center to the surface of the wheel 5. This distance is measured in Figs. 2 and 3 as the horizontal distance from the pivotal center of the standard 9 to the surface of the wheel 5. It, therefore, follows that, as the motor and friction disk 11 are swung into different positions, the surface 12 will engage the wheel 5 with a substantially uniform pressure at all positions, so that an even and firm engagement will be secured at the various driving positions.

The central portion 13 of the disk 11 is preferably flattened, so that, when the motor stands in the central or off position illustrated in Fig. 2, the disk will be completely disengaged from the wheel. This will allow the motor to run free without a loss of power by reason of friction. As soon as the motor is swung through a small angle, the surface 12 will commence to engage the wheel 5 and the driving connection will be established.

In order to secure a uniform pressure of the desired amount, we prefer to mount the disk 11 so that it will be held in engagement with the wheel 5 under spring pressure. For this purpose, said disk is conveniently illustrated as provided with an arbor 14 slidably mounted on the motor shaft. The arbor is provided with a slot 15 which receives a pin 16 of the motor shaft. A spring 17 serves to carry the arbor and friction disk out toward the wheel 5 until said movement is limited by the engagement of the pin with the slot. The limitation, thus imposed, is such that, when the motor stands in the central position, the friction disk will be disengaged from the wheel by reason of the flattened portion 13. As soon as the motor is swung a slight distance, however, the working surface 12 will engage the wheel, and this engagement will be maintained under spring pressure as the motor and disk are moved back and forth into different driving positions.

As a convenient means for controlling the position of the motor and the friction disk, we provide a pedal 18. This pedal is pivotally mounted to rock on the pivot 19, and has the foot-pieces 20 and 21, by means of which it can be rocked back and forth. A link 22 connects the pedal to the platform 7, so that the motor will be properly rocked back and forth. The pedal is conveniently mounted to one side of the front of the press, so that it can be conveniently manipulated by the operator without the necessity of his changing positions.

It will be seen that, by means of the foregoing construction, not only can the speed of the press be controlled, but also that the direction of the rotation of the press can be controlled by swinging the motor back and forth across the central or neutral position.

It is desirable to provide means whereby the operator may receive a definite indication as to the exact position which the motor occupies, so that the operator can bring the motor back to such position the next time an operation commences. For this purpose we have provided a scale 23, the same having its edge portion 24 formed as the segment of a circle drawn about the axis of motor adjustment, and the scale being provided with any suitable index of numbers or other characters 25. A pointer 26 is secured to a stationary part, as for example the standard 9, and this pointer will indicate the instantaneous position of the motor.

While we have herein shown and described only a single embodiment of the features of our invention still it will be understood that we do not limit ourselves to this particular embodiment, except as we may do so in the claims, but that we include within the scope of our invention any equivalent constructions operating in equivalent manner to produce equivalent results.

We claim:

1. In a variable speed friction driving mechanism, the combination with a driven wheel, of a driving motor, a platform on which said motor is mounted, a pivotal mounting for the platform, the axis of said pivotal mounting intersecting the axis of the motor shaft, a friction disk slidably mounted on the motor shaft in position adjacent to the driven wheel, the peripheral portion of the working surface of said friction disk being formed on a sphere having its center at the point of intersection of the axis of the pivotal mounting with the motor shaft, and the central portion of the working surface of said disk being flattened, a driving connection between the motor shaft and said disk, means for carrying the disk toward the driven wheel, said driving connection also arresting said carrying movement before the friction disk contacts the driven wheel when the friction disk stands in neutral position, and means for swinging the platform into desired positions.

2. In a friction drive mechanism, the combination with a driven wheel, of a motor, a pivotal mounting for said motor whereby the shaft of the motor may be swung across the plane of the driven wheel, said pivotal mounting intersecting the shaft of the motor, a friction disk slidably mounted on the motor shaft, the peripheral portion of the working surface of said friction disk being formed on the surface of the sphere having its center at the point of intersection of the pivotal mounting with the motor shaft, and the central portion of said working surface being flattened, means for carrying the friction disk toward the driven wheel, means for arresting said carrying movement before the friction disk contacts with the driven wheel when the friction disk stands in neutral position, and means for swinging the motor about its pivotal mounting to carry the friction disk across the face of the driven wheel.

3. The combination with a driven wheel, of a motor, a pivotal mounting for said motor whereby it may be swung to carry the center line of its shaft across the plane of the driven wheel, a friction disk mounted on the motor shaft in position to engage the driven wheel, a pedal for swinging the motor in either direction, said pedal being mounted adjacent to that portion of the driven wheel away from the motor, and an operative connection from said pedal to the pivotal mounting of the motor.

CEACIL C. ASHTON.
ARTHUR WAGNER.

Witnesses:
THOMAS A. BANNING,
WM. P. BOND.